March 26, 1940.   G. BROULHIET   2,194,996
STARTING DEVICE
Filed Sept. 2, 1936   3 Sheets-Sheet 1
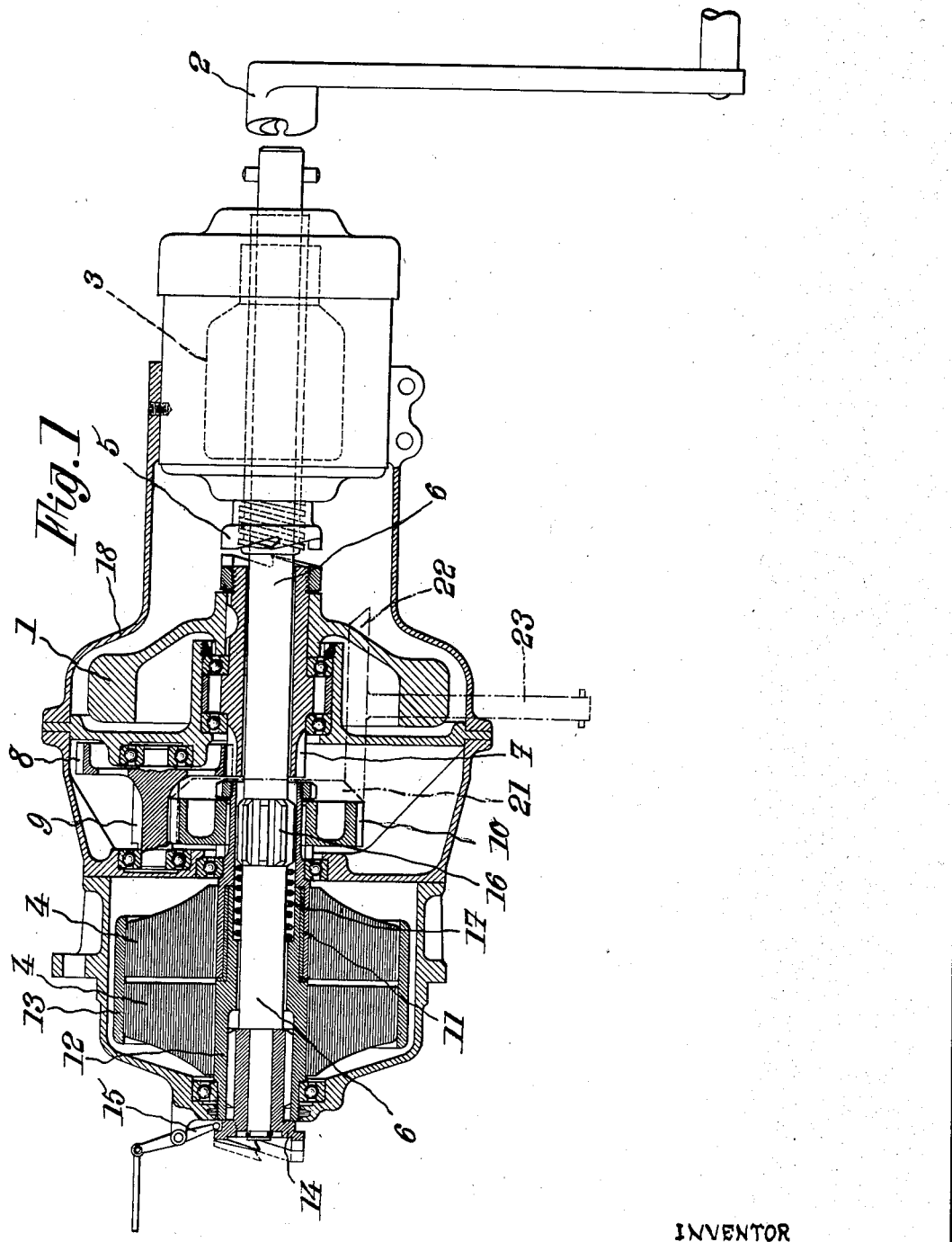
INVENTOR
GEORGES BROULHIET
ATTORNEYS March 26, 1940.  G. BROULHIET  2,194,996
STARTING DEVICE
Filed Sept. 2, 1936    3 Sheets-Sheet 2
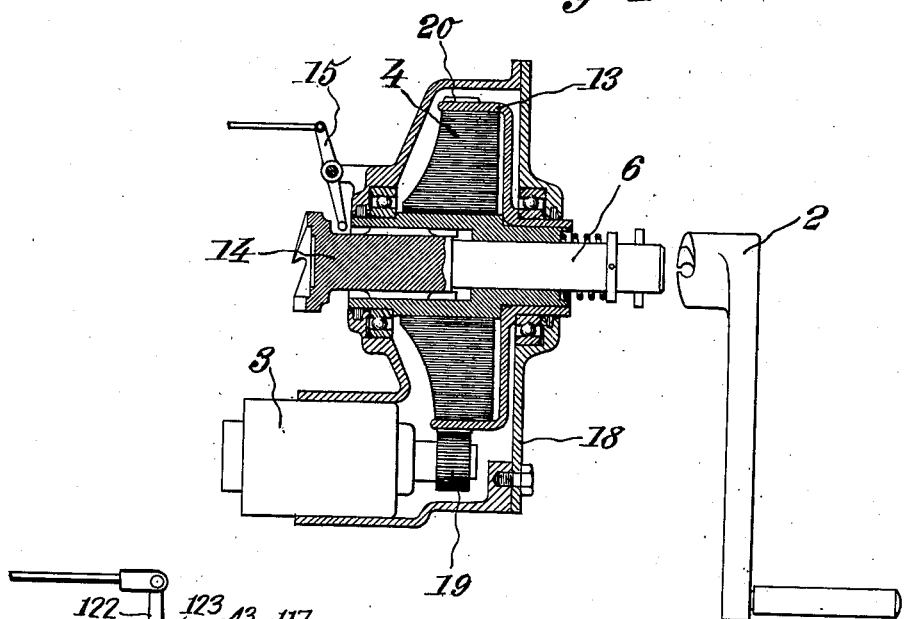
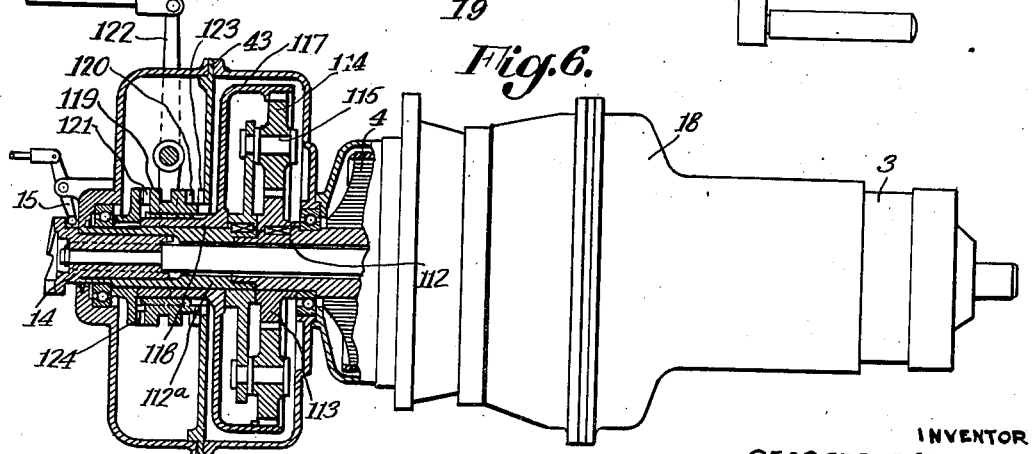
INVENTOR
GEORGES BROULHIET
ATTORNEYS

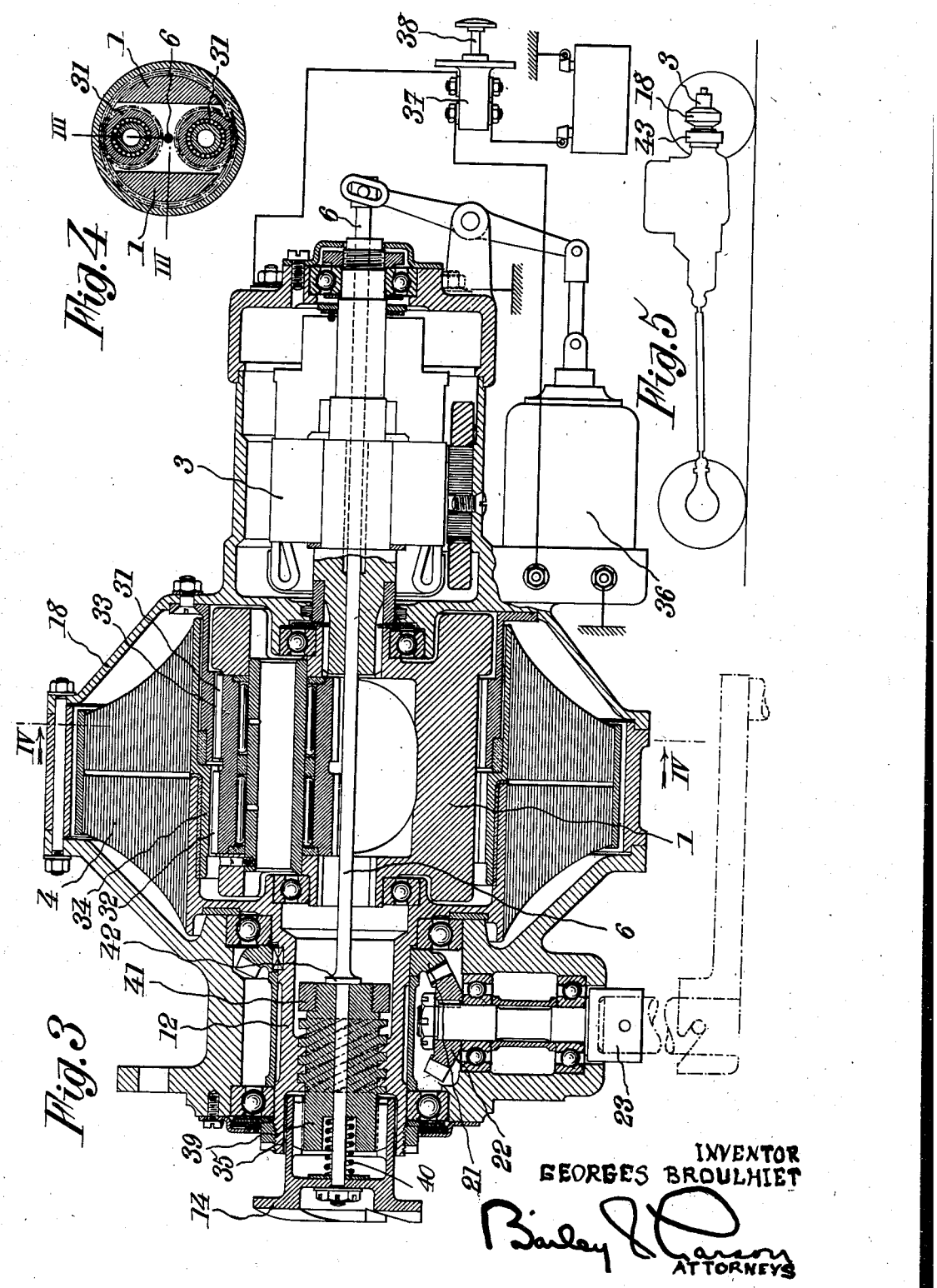

Patented Mar. 26, 1940

2,194,996

UNITED STATES PATENT OFFICE 2,194,996

STARTING DEVICE

Georges Broulhiet, Paris, France

Application September 2, 1936, Serial No. 99,119
In Belgium July 27, 1936

12 Claims. (Cl. 123—179)

The present invention relates to means for starting into movement a body or a system of pieces, whatever be the kind of movement to be imparted to these pieces. The invention is more especially, although not exclusively, concerned with devices of this kind for driving rotary parts, for instance for starting explosion engines or internal combustion engines.

The object of the present invention is to provide a device of this kind of a higher efficiency than devices used for this purpose prior to the present invention, in which prior devices, including a frictional clutch, the efficiency was at most 25%, as it will be hereinafter explained.

The essential feature of the present invention consists, while devising the system in such manner as to permit of accumulating a living force prior to coupling it with the parts to be driven, in making use, for transmitting said living force to said parts, of an elastic coupling which, absorbing a portion of said energy as soon as the coupling is effected, is subsequently capable of giving it up nearly entirely to the parts to be driven.

Another feature of the present invention, concerning starting devices of any type whatever for internal combustion engines and explosion engines, consists in interposing an elastic joint between said devices and said engines.

Another feature of the invention consists, in starting devices of the inertia type including a fly-wheel or any other device rotated by an auxiliary motor, in combining therewith a manual driving device which also permits of rotating said fly-wheel and of effecting the coupling with the engine to be started only when a certain living force has been accumulated.

Other features of the present invention will result from the following detailed description of some specific embodiments thereof.

Preferred embodiments of the present invention will be hereinafter described, with reference to the accompanying drawings, given merely by way of example, and in which:

Fig. 1 is an axial sectional view of a starting device made according to a first embodiment of the invention;

Figs. 2 and 3 are views, similar to Fig. 1, of two other embodiments;

Fig. 4 is a sectional view on a reduced scale on the line 4—4 of Fig. 3.

Fig. 5 is a diagrammatic view of the device according to the invention as shown, for example, in Figs. 1 to 3 applied to a vehicle for starting the same and for accelerating the driving force thereof.

Fig. 6 is a view similar to Fig. 1 of another embodiment of the invention.

The invention relates to devices for starting a part or a mechanism, said devices being more especially of the inertia type, that is to say of the type accumulating a certain amount of living force before being coupled with the engine or other mechanism to be started.

In existing devices of this kind, a certain amount of living force is stored up in a fly-wheel which is driven at high speed. This energy is subsequently given back to the engine through a clutch including a sliding joint.

In accordance with the theory of shocks and percussions and especially with the formula giving the resultant velocity of two masses after coupling thereof as a function of the velocity of the driving, which formula is the following:

$$v = V \frac{m}{mM}$$

in which velocities $v$ and $V$ represent angular velocities and $m$ and $M$ the masses or moments of inertia about the axis of revolution, it is found that the maximum energy that is conveyed is only one quarter of the energy of the driving mass, one half being absorbed by the clutch and the remaining quarter being left on the driving mass, that is to say on the fly-wheel.

Besides, it should be noted that these optimum conditions (efficiency of 25%) are only obtained when both masses M and $m$, or their inertia moments, are of the same value.

It has been suggested, in order to reduce the driving mass, to multiply its velocity through any suitable speed multiplying gear, which is tantamount, in the above formula, to multiplying the mass by the square of the gear ratio. The reduction of weight that is thus obtained (and which is counterbalanced to a certain amount by the complication and the weight of the speed multiplying gear) does not exclude the losses above referred to.

The principle of the present invention consists in wholly eliminating these losses, and therefore in rendering the efficiency nearly equal to 100%, by substituting for the friction gear above referred to an elastic coupling or joint which is capable of absorbing half of the energy of the driving mass and of subsequently giving it back nearly entirely, the whole working in the following manner:

When coupling the two masses together, the work which, in an ordinary starting device of the ordinary frictional or sliding type, would be absorbed by the friction is in this case stored up in the elastic joint until the velocities of the driving shaft and the driven shaft are equal.

The theory of momentums shows that, at this time, the energy absorbed by the elasticity of the joint is exactly equal to one half of the energy that is brought into play. As the joint tends to come back into its initial position, the energy is given back, to the engine on the one hand, and to the driving mass on the other hand. Therefore, equal and opposite momentums convey to the engine the whole of the energy elastically stored up in the joint, the driving mass coming back to a velocity equal to zero at the end of the expansion.

Theory and calculation show that the efficiency may be as high as 100%, the mechanical losses having to be omitted, provided that the following conditions, which, as a matter of fact, are not wholly necessary, according to the invention, are complied with:

a. The driving mass, or, if a speed multiplying gear is provided, the virtual mass corresponding thereto, must be equal to the mass of the engine; and b. The elastic joint must be capable of absorbing one half of the living force imparted by the driving mass.

The first of these conditions may be stated otherwise. Calculation shows that, according to the ratio of the masses, the velocity of mass $m$ may be caused, at the end of the operation, either to keep a residuary value which is positive, or to become zero, or again to assume a negative value.

The maximum of efficiency corresponds to the case in which this velocity becomes zero, so that it is preferable, according to the present invention, to calculate the ratio of masses $M$ and $m$ in such manner that the driving mass or fly-wheel $m$ is brought back to a velocity equal to zero at the end of the operation, having thus given back the whole of its energy to the mass $M$ to be driven.

Of course, it is also necessary to calculate the elasticity of the joint in such manner that the maximum starting torque transmitted to the engine is not capable of twisting the crankshaft. But, in any case, this torque will be applied gradually, that is to say by starting from the zero value corresponding to the beginning of the coupling.

There are many possible embodiments of an apparatus according to the present invention.

For instance, concerning first the driving mass, it may consist of any suitable fly-wheel such as I (Figs. 1 and 3) which directly drives the elastic joint, or drives it through a speed reducing gear, the present invention permitting, owing to the very high efficiency that is obtained, to considerably reduce the weight of this mass, for instance down to some hundreds of grammes.

This mass may be driven either manually by means of a crank 2 or by means of a motor, for instance an electric motor 3, or again at will by means of either of these two systems, according to a particularly advantageous arrangement which will be hereinafter described.

When the mass is driven by a motor, and on account of the fact that the weight of the driving mass in question may be very small, I may constitute said mass of the armature of the motor, as shown by Fig. 2.

I find that it is particularly advantageous to make use of an elastic system consisting essentially of at least one block of gum or rubber, undergoing torsional stresses and of a shape such that these stresses are substantially the same at all points.

Such a block will consist for instance of a ring connected to the driving and driven elements at its periphery and at its central part respectively, the axial section of said ring being such that the product of its thickness by the square of the distance from the axis is substantially constant.

The elastic material thus works under the best possible conditions, and it is possible to apply for instance one kilogrammeter per gramme of matter. Consequently, the space occupied by the device is very small; furthermore, said spring keeps the same external shape during its working so that no supplementary space is to be provided between the surface of the ring and the casing that surrounds it.

But it should be well understood that the invention is not in any way limited to the use of elastic joints of this particular type. I may make use of any elastic coupling, as far as the word "coupling" means any system capable, from the time when the living energy is applied to the engine, movable body or mechanism to be started, of elastically storing up energy, and subsequently giving back said energy entirely to said engine, movable body, or mechanism.

When use is made of a speed reducing gear interposed in the transmission between the driving mass and the mass to be driven and, in particular, when use is made of the elastic system more especially described above, it is advantageous, according to an arrangement more specifically described hereinafter with reference to Fig. 3, to arrange this speed reducing gear on the inside of said elastic device, which further reduces the space occupied by the whole system according to the invention.

The means for applying the living energy stored up by mass $m$ to the engine to be started (or any other mechanism), consists for instance of a system of cooperating dogs such as 14, and said means are brought into operative engagement, either manually or automatically, as soon as sufficient living energy has been accumulated in the mass 4 or fly-wheel I.

In the case of an automatic operation of these means, I may, for instance, either make use of the velocity of said mass for producing the working of the system as soon as this velocity has reached a certain value, or have recourse to a relay capable of bringing said means into play only a certain time, for instance some seconds, after the starting motor such as 3 has been brought into action. But of course these solutions are indicated merely by way of example and they do not exclude the use of other arrangements.

Furthermore, means are advantageously provided for automatically bringing back the whole of the starting device into its inactive position as soon as the engine to be started is running. Such means will be described hereinafter.

I will now desire more in detail some specific embodiments of the device according to the present invention.

In the embodiment of Fig. 1, the electric motor 3 is adapted to drive, preferably through an automatic coupling 5 of a known type, fly-wheel I, which is for instance arranged coaxially.

The parts to be driven by the fly-wheel, especially the elastic joints, are advantageously disposed coaxially, which permits of mounting the whole of the parts along a central shaft 6 which, as it will be hereinafter explained, permits manual driving.

The movement of the fly-wheel is transmitted to the elastic joint through a speed reducing gear 7—8—9—10. In the embodiment of Fig. 1, said joint includes two rubber masses 4 which are fixed, in their central parts, one to a sleeve 11 driven by the last pinion 10 of the speed reducing gear and the other to a hollow shaft 12 intended to transmit the movement to the engine to be started, these two masses being assembled together, at the periphery, by means of a sleeve 13.

In order to couple this system to the engine to be started, I make use of a dog device 14, for instance slidably mounted in the hollow shaft 12 and actuated for instance through a lever 15, which may be operated from a distance, either manually or automatically.

Finally, in order to permit of driving the starting device manually, I employ, in the embodiment of Fig. 1, a central shaft 6 on which the parts above mentioned are freely mounted, with the exception of sleeve 11, connected to said shaft through a key of any kind 16, which permits of imparting to said shaft a certain displacement which produces the coupling of device 14 with the engine, said shaft 6 pushing this device against the action of a spring 17.

In order to drive the device manually, crank 2 is fitted on the end of shaft 6 and it is turned in such manner as to drive the whole, until a certain energy has been stored up in the fly-wheel. Then a thrust is exerted so as to produce the engagement of the parts at 14.

I thus provide a system which, even for powerful engines such as those of heavy vehicles, can be of very small size, this system being housed in a casing 18 which can easily be fitted in a free space.

Of course, the manual operation might be effected in other ways. For instance pinion 10 might be operated through a couple of bevel pinions 21, 22 driven by a shaft 23 at the end of which the crank would be fitted, a drive of the same kind being shown in Fig. 3, in which the same reference characters have been employed.

In Fig. 2, I have shown a system of the same kind in which the fly-wheel has been dispensed with, the mass $m$ being then chiefly constituted by the armature of the driving motor 3.

This motor 3 is advantageously mounted laterally and it drives the elastic joint through the medium, for instance, of a pinion 19 in mesh with teeth 20 provided on sleeve 13, which also acts as fly-wheel. Shaft 6, in this case, is mounted in line with the system of dogs 14.

If the power to be transmitted is relatively small, I make use of a single elastic ring 4, as shown in Fig. 2.

In Fig. 3, I have shown still another embodiment which further reduces the space occupied by the device owing to the fact that the speed reducing gear is disposed inside the driving shaft. Advantageously, this speed reducing gear consists of a pair of planet wheels coaxially disposed and the diameters of the base circles of which are only very little different. These sun-wheels are driven in the rotary movement of the driving element and they roll respectively on a fixed toothed wheel and on a movable toothed wheel, the latter being connected to the element to be driven.

Such an arrangement is particularly advantageous in the case in which the sun-wheels, such as 31 and 32 are disposed inside toothed rings 33, 34, said sun-wheels being then eventually either of a diameter smaller than the radius of said toothed rings or of a diameter greater than said radius, and being for instance driven by a crank or eccentric.

In any case, by choosing, for the diameters $d$ and $d^1$ of the pitch circles of the sun-wheels and also for those $D$ and $D^1$ of the toothed rings values that are little different, a very high speed reducing ratio is obtained, although the whole occupies but little space.

By making for instance the teeth in such manner that the numbers of teeth $N$ and $N^1$ of the two toothed rings (as for those $n$ and $n^1$ of the two sun-wheels, the same module is chosen) differ only by one unit, I may easily obtain ratios ranging from 50 to 100 and even higher than 100, in the case in which the diameter of the sun-wheels is higher than half the diameter of the toothed rings. Besides it is also possible to employ different modules, in which case the sun-wheels may have the same number of teeth, only the systems of teeth corresponding to $N$ and $N^1$ differing by one unit.

Furthermore, it is advantageous, as shown by the drawings, to combine the fly-wheel 1 and the sun-wheels 31, 32 into a single unit, note Fig. 4.

The movement of the electric motor 3 is therefore transmitted, as in accordance with the embodiment of Fig. 1, to the whole of the sun-wheels and the fly-wheel. The sun-wheels, rolling on toothed ring 33 fixed to frame 18, cause element 34, fixed to the central part of the first joint element 4, to rotate at low speed. Then the movement is transmitted, through the hollow shaft 12, to the coupling dog system 14, slidably mounted on said shaft, which is provided with a longitudinal groove at 35.

The displacements of this device may, in this case also, be obtained by means of a rod such as 6, itself controlled for instance by a relay 36, which can be operated electrically (through an electro-magnet or a solenoid), or in any other way.

In order to correctly supply electric current to motor 3 and relay 36, when the latter is of the electrically operated type, I make use, for instance, of a double contacting device 37 permitting, in a first position, of sending current to the motor, and, in a second position, of cutting off said current, but of feeding current to solenoid 36 or the like. This device will be, for instance a contacting device including a push piece, such as 38, adapted to be pushed for the first operation and pulled for the second one. Of course, I may employ, in combination with this contacting device, an intermediate relay, in such manner as to avoid passing the whole of the current through said contacting device, the drawings being diagrammatic and being given merely by way of example.

In order to permit of obtaining the disengagement once the engine is started, it is advantageous to make use of a mass such as 39 arranged in such manner that, when a positive acceleration is imparted to the starting device, that is to say during the starting, said mass tends to move the coupling device 14 toward the driving shaft, whereas it exerts an opposed action once the engine is started.

This mass 39 will, for instance, consist of a screw of suitable pitch, screwed in hollow shaft 12 and sliding on rod 6.

During the starting of the starting device, this mass, under the effect of the acceleration, compresses a spring 40 until a stop ring 41 limits its movement. In the course of this movement, it does not drive rod 6.

The coupling, through the thrust of rod 6 and the sliding displacement of element 14 along the grooved end portion of shaft 12, can therefore take place normally and a shoulder 42 of rod 6 comes to butt against mass 39.

As long as the starting of the engine takes place, mass 39 has a tendency, under the effect of the deceleration, to push back shoulder 42, and therefore rod 6 and element 14. This becomes effective as soon as the engine, being started, leaves the coupling dogs. Element 14 then automatically returns to a remote position.

But it should be well understood that any other means might be employed for the same purpose.

In the preceding description, it has been supposed that the elastic coupling was devised in such manner as to be connected in direct drive with the engine shaft or the mechanism to be started.

In point of fact, it will be readily understood that the total energy to be developed in the rotating masses of the driving system having being calculated as a function of the energy to be absorbed by the system to be started, it is then necessary to take into account the resisting torque applied to this system and the time during which it is desired that the energy should be absorbed. Under these conditions, it may be advantageous and even necessary for certain applications to apply to the elastic mass when it is started not the resisting torque but a torque different therefrom.

Whatever be the embodiment that is chosen, I obtain a system the operation of which, which results sufficiently clearly from the preceding description, may be summed up as follows (it being supposed that it is desired to start an engine):

The living energy, having been stored up in the rotating parts of the starting device, is gradually given up to the engine, the torque being first equal to zero, then increasing owing to the work of the elastic joint, which work is subsequently given back to the engine to be started. Finally, if the living energy that is accumulated is equal to that necessary to the engine for starting and if masses M and m comply with the conditions above set forth, the mass will be brought back to a speed equal to zero when the engine starts. In other words, the whole of the energy shall have been utilized.

Such a system has many advantages over systems of the same kind existing prior to this invention some of these advantages being the following:

1. The efficiency is nearly equal to 100%;
2. The device calls for only little power and occupies but little space;
3. This device is of light weight, which is very advantageous for aviation;
4. It is simple and little expensive.

Owing to the low power necessary for operating the electric motor, there will no longer be any risk of deteriorating the batteries of the vehicles. In cold weather, especially, the sudden consumptions of current necessitated by the motors of the usual starting devices will be avoided.

According to another feature of the invention, I may make use of a driving or starting system according to the preceding description, not only for starting an engine, but for driving the vehicle itself, for instance in all cases in which it may be of interest to give said vehicle an acceleration greater than that which could be obtained from the engine.

In this case, I interpose between the elastic joint and element 14 or the equivalent a speed or torque changing gear such as 43 (Fig. 5) and, of course, the masses of the driving system, same as the electric motor by means of which they are actuated, will be calculated in such manner as to permit of storing up the desired energy, for instance 5000 kgms. (which necessitates only 5 kgs. of gum).

This energy might be utilized either for starting the vehicle, or only for imparting thereto, especially at low speeds, a supplementary acceleration (more particularly in the case of aerodynamic vehicles fitted with engines of relatively low power). This energy might be applied either at the shaft end, as shown, or at any other place.

Finally, it should be noted that the features concerning the speed reducing or multiplying gears more especially described with reference to Fig. 3 are applicable to other systems, and especially to lifting apparatus, these features being advantageous whenever it is desired to obtain a high ratio of transformation under a very small volume.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for imparting speed variations to a moving vehicle, which comprises, in combination, a fly-wheel for storing up living energy carried by said vehicle, means for driving said fly-wheel, and a transmission device for coupling said fly-wheel with said vehicle, said transmission device including an elastic joint having one end connected with said fly-wheel and being adapted to absorb first and then to give up energy equal to at least one-half of the inertia energy absorbed by movement of said vehicle during speed variations imparted thereto, means for connecting the other end of said joint with said vehicle, in a temporary manner, and means for controlling the last mentioned connecting means.

2. A device for imparting speed variations to a movable body comprising, in combination, means for storing energy, means for transmitting said energy between said storing means and said body, said transmitting means including an elastic element adapted first to absorb and then give up at least substantially one-half the energy in said storing means, and coupling means for temporarily connecting said storing means to said body.

3. In an engine inertia starter, a rotatable mass for storing energy, means for transmitting said energy from said mass to the engine to be started, said transmitting means including an elastic energy accumulator adapted first to absorb and then to give up energy equal to at least substantially one-half of the inertia energy of the rotating parts of the engine to be started when said parts are brought from still position to the minimum starting speed, and coupling means for temporarily connecting said starter to the engine to be started.

4. A device for imparting speed variations to a movable body comprising, in combination, means for storing energy, and transmission means for temporarily coupling said storing means and said body, said transmission means including an elastic energy accumulator adapted first to absorb and then to give up an energy equal to at least substantially one-half of the inertia energy of said body when the latter is brought from the speed at the beginning of the speed variations to the speed at the end of said variations.

5. An engine inertia starter as in claim 3, said elastic accumulator comprising a mass of rubber adapted to store energy by torsional stressing.

6. A device as in claim 4, said elastic accumulator comprising a mass of rubber adapted to store energy by torsional stressing.

7. A device for imparting speed variations to a movable body comprising, in combination, a rotatable mass for storing energy, means for driving said mass to store energy therein, transmission means between said mass and said body including an elastic joint adapted first to absorb and then to give up a substantial part of the energy stored in said mass and being in permanent operative connection with said mass, positive coupling means for temporarily connecting said elastic joint with said movable body, and means for controlling said coupling means.

8. A device for imparting speed variations to a movable body comprising, in combination, a rotatable mass for storing energy, means for driving said mass to store energy therein, elastic energy accumulating means adapted first to absorb and then to give up a substantial part of the energy stored in said mass, means connecting said elastic means with said mass and adapted to transmit substantially the total energy given up by said mass to said elastic means, and positive frictionless connecting means for temporarily connecting said elastic means with said movable body, said connecting means including a positive coupling and means for controlling said coupling.

9. In a device as in claim 7, said elastic joint comprising two annular resilient rubber members, a band, one member being connected at its inner periphery to said mass and at its outer periphery to said band, and the other member having its outer periphery joined to said band and its inner periphery joined to said coupling means.

10. A device for imparting speed variations to a movable body comprising, in combination, an electric motor having an armature adapted to act as a flywheel, a transmission device for coupling said flywheel with said movable body including an elastic joint having one end operatively connected with said flywheel, means for releasably connecting the other end of said joint with said movable body, said joint being adapted first to store up and then give up a substantial part of the energy created by rotation of said armature, and means for controlling said releasable connecting means.

11. A device for imparting speed variations to a movable body comprising, in combination, a rotatable mass for storing energy, coupling means for temporarily coupling said mass to said body, one part of said coupling means being connected to said mass and the other part being connected to said movable body, means for controlling said coupling means, said coupling means comprising an elastic energy accumulator, the storing capacity of which is such that the speed of the coupling part connected to said mass is substantially the same immediately before connecting said mass and said body as at the moment at which said body reaches its greatest speed under the effect of energy transmission from said mass to said body.

12. An energy transmitting device for coupling two movable bodies, each of which has a given mass comprising a deformable elastic element connecting said bodies to each other and having the capacity of absorbing at least half the inertia energy from the movement of the mass of one body when the other body is stationary, and of releasing substantially all the absorbed energy to bring said stationary body into motion.

GEORGES BROULHIET.